(12) United States Patent
Ellis et al.

(10) Patent No.: US 7,769,669 B1
(45) Date of Patent: Aug. 3, 2010

(54) ELECTRONIC NETTING SYSTEM FOR BILATERAL TRADES

(75) Inventors: Paul Ellis, Haslemere (GB); Mark Rowell, London (GB); Henry Etkin, New York, NY (US)

(73) Assignee: Creditex Group, Inc., New York, NY (US)

( * ) Notice: Subject to any disclaimer, the term of this patent is extended or adjusted under 35 U.S.C. 154(b) by 1229 days.

(21) Appl. No.: 11/319,002

(22) Filed: Dec. 27, 2005

(51) Int. Cl.
    *G06Q 30/00* (2006.01)
(52) U.S. Cl. .............................. 705/37; 705/26; 705/35; 705/36; 705/38
(58) Field of Classification Search .................. 705/35, 705/36, 37, 38, 26
    See application file for complete search history.

(56) References Cited

U.S. PATENT DOCUMENTS

| | | | |
|---|---|---|---|
| 6,377,940 B2 | 4/2002 | Tilfors et al. | |
| 6,405,180 B2 | 6/2002 | Tilfors et al. | |
| 6,408,282 B1 * | 6/2002 | Buist .......................... | 705/36 R |
| 6,601,044 B1 * | 7/2003 | Wallman .................... | 705/36 R |
| 6,618,707 B1 | 9/2003 | Gary | |
| 7,117,176 B2 * | 10/2006 | Wallman .................... | 705/36 R |
| 7,177,833 B1 | 2/2007 | Marynowski et al. | |
| 7,251,629 B1 | 7/2007 | Paul | |
| 2003/0083978 A1 * | 5/2003 | Brouwer ....................... | 705/37 |

* cited by examiner

Primary Examiner—Nga B. Nguyen
(74) Attorney, Agent, or Firm—DLA Piper LLP (US)

(57) ABSTRACT

An electronic netting system. The system may include: (a) a plurality of individual, segregated counterparties for providing bilateral trades, (b) a multi-lateral transaction hub, and (c) a trading system in communication with the transaction hub. The multi-lateral transaction hub may be for (i) providing an aggregation of trades between the counterparties, (ii) providing for multi-lateral netting of selected and authorized bilateral trades, and (iii) apportioning the accumulated trade values among the counterparties according to pre-determined netting parameters including a weighted distribution selectable by at least one of the counterparties. The transaction hub may include: (i) a trade processing system and (ii) a netting system in communication with the trade processing system for providing for the optimized, multi-lateral netting of selected and authorized bilateral trades and apportioning the accumulated trade values among the counterparties.

35 Claims, 9 Drawing Sheets

ELECTRONIC NETTING SYSTEM FOR BILATERAL TRADES

BACKGROUND OF THE INVENTION (1) Field of the Invention

The present invention relates generally to electronic trading systems and, more particularly, to a system for multi-lateral netting of bilateral trades of OTC derivatives.

(2) Description of the Prior Art

Financial derivatives are contracts of which the price/value of the contract varies with the value of an underlying instrument. Financial derivatives can either be standardized contracts traded on a recognized Exchange or OTC traded. OTC derivatives are individually negotiated and tailor-made between two counterparties (so called "over the counter (OTC) transactions"). The parties do their own valuation of the contracts both when dealing as well as later on when establishing the market value of their contracts during their life.

Participants in the OTC markets are banks, investment banks and other financial institutions. The International Swap and Derivatives Association is a trade organization for dealers active in the OTC derivatives market. An OTC derivative transaction allows the financial institution to manage its market risk positions, either for the purpose of hedging or for the purpose of deliberate position taking to make a profit from an expected change in market prices. Derivatives allow the market risk of substantial amounts to change hands without the need and associated costs of transferring the underlying values.

A thorough discussion of other aspects of OTC derivatives may be found in U.S. Published Patent Application 2003-0083978 entitled "System and method of implementing massive early terminations of long term financial contracts" by Brouwer which is hereby incorporated by reference in its entirely.

However, because of the volume of trade, it is often possible that the counterparties involved have off-setting trades which, if "ripped up" prior to the confirmation process, can result in reduction of costs to the counterparties such as reduction in economic and regulatory capital usage; and reduction in counterparty risk exposure. As can be appreciated, offsetting bi-lateral trades between just two counterparties is a simple process. However, offsetting or netting trades between a plurality of individual, segregated counterparties to provide for multi-lateral netting is more complex.

Thus, there remains a need for a new and improved electronic netting system which provides netting of bilateral trades while, at the same time, is operable to provide optimized, multi-lateral netting among a plurality of individual, segregated counterparties.

SUMMARY OF THE INVENTION

The present invention is directed to an electronic netting system. The system may include: (a) a plurality of individual, segregated counterparties for providing bilateral trades, (b) a multi-lateral transaction hub, and (c) a trading system in communication with the transaction hub. The multi-lateral transaction hub may be for (i) providing an aggregation of trades between the counterparties, (ii) providing for multi-lateral netting of selected and authorized bilateral trades, (iii) apportioning the accumulated trade values among the counterparties according to pre-determined netting parameters including a weighted distribution selectable by at least one of the counterparties; and (iv) including the selection of a preferred counterparty credit exposure.

In a preferred embodiment, the individual, segregated counterparties are financial institutions. The financial institutions may be banks. The banks may include investment banks.

Also in a preferred embodiment, the bilateral trades are OTC derivatives. The OTC derivatives may be credit derivatives. The credit derivatives may be credit indices.

Preferably, the transaction hub may include: (i) a trade processing system (ii) a netting system in communication with the trade processing system for providing for the optimized, multi-lateral netting of selected and authorized bilateral trades and apportioning the accumulated trade values among the counterparties; and (iii) a trade confirmation matching service.

The trade processing system may include an input of the bilateral trades and a database for storing the input and an output of the trades. The input may include the parties, the instrument, the price, the size, and the upfront fee. The input may further include additional trade details. The input may also include data from E-trading. The trade processing system may further include external trade input. In a preferred embodiment, the output may include trade confirmations.

In an embodiment, the trade processing system may further include a trade verification module. The trade verification module may be bilaterally verified.

Preferably, the netting system may include an input of trades ($T_1, T_2, \ldots T_N$), a recursive application of the optimization algorithm of the optimization engine, and an output of netted trades. The recursive optimization engine may further include a first netting interval. The recursive optimization engine may also include at least one subsequent netting interval for netting the remainder of unnetted and netted trades from the preceding netting interval. In an embodiment, the netting system may further include an input of additional netting parameters. The additional netting parameters may include at least one counterparty trading limit.

In one embodiment, the output of netted trades may further include a payment output. The payments may be netted. The payments may also be collected by a central party.

The output of netted trades may also include a reconciliation output. Preferably, the additional netting parameters may include netting constraints. The netting constraints may be selected from the group consisting of limits of trades; limits of notional and combinations thereof. The additional netting parameters may include netting objectives. In an embodiment, the netting objectives may be selected from the group consisting of total gross notionals; number of trades; variance of the notional; distribution of netted trades by counterparty (i.e. the counterparty credit exposure distribution); and combinations thereof.

In a preferred embodiment, the netting system may also include an input of additional algorithm parameters. The additional algorithm parameters may include a notional change selector or a party search order.

Preferably, the trading system may be an intermediary party such as an E-trading system. The intermediary party may include at least one voice broker. Alternatively, the intermediary party may include at least one voice broker and an E-trading system.

Accordingly, one aspect of the present invention is to provide an electronic netting system. The system may include: (a) a plurality of individual, segregated counterparties for providing bilateral trades; (b) a centralized, multi-lateral transaction hub; and (c) a plurality of counterparty intermediaries for credit risk purposes. The centralized, multi-lateral transaction hub may be for: (i) providing an aggregation of trades between the counterparties; (ii) providing for multi-lateral netting of selected and authorized bilateral trades; and (iii) apportioning the accumulated trade values among the counterparties according to pre-determined netting parameters including a weighted distribution.

Another aspect of the present invention is to provide a multi-lateral transaction hub for providing an aggregation of trades between a plurality of individual, segregated counterparties and providing for the multi-lateral netting of selected and authorized bilateral trades. The transaction hub may include: (a) a trade processing system; and (b) a netting system in communication with the trade processing system for providing the optimized, multi-lateral netting of selected and authorized bilateral trades and apportioning the accumulated trade values among the counterparties according to pre-determined netting parameters including a weighted distribution selectable by at least one of the counterparties.

Still another aspect of the present invention is to provide an electronic netting system. The system may include: (a) a plurality of individual, segregated counterparties for providing bilateral trades; (b) a multi-lateral transaction hub for: (i) providing an aggregation of trades between the counterparties; (ii) providing for multi-lateral netting of selected and authorized bilateral trades; and (iii) apportioning the accumulated trade values among the counterparties according to pre-determined netting parameters including a weighted distribution selectable by at least one of the counterparties, the transaction hub including: (i) a trade processing system; and (ii) a netting system in communication with the trade processing system for providing for the optimized, multi-lateral netting of selected and authorized bilateral trades and apportioning the accumulated trade values among the counterparties; and (c) a trading system in communication with the transaction hub.

These and other aspects of the present invention will become apparent to those skilled in the art after a reading of the following description of the preferred embodiment when considered with the drawings.

BRIEF DESCRIPTION OF THE DRAWINGS

FIG. 8 is a screen shot of the output from the transaction hub following aggregation and multi-lateral netting of the selected and authorized bilateral trades.

DESCRIPTION OF THE PREFERRED EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
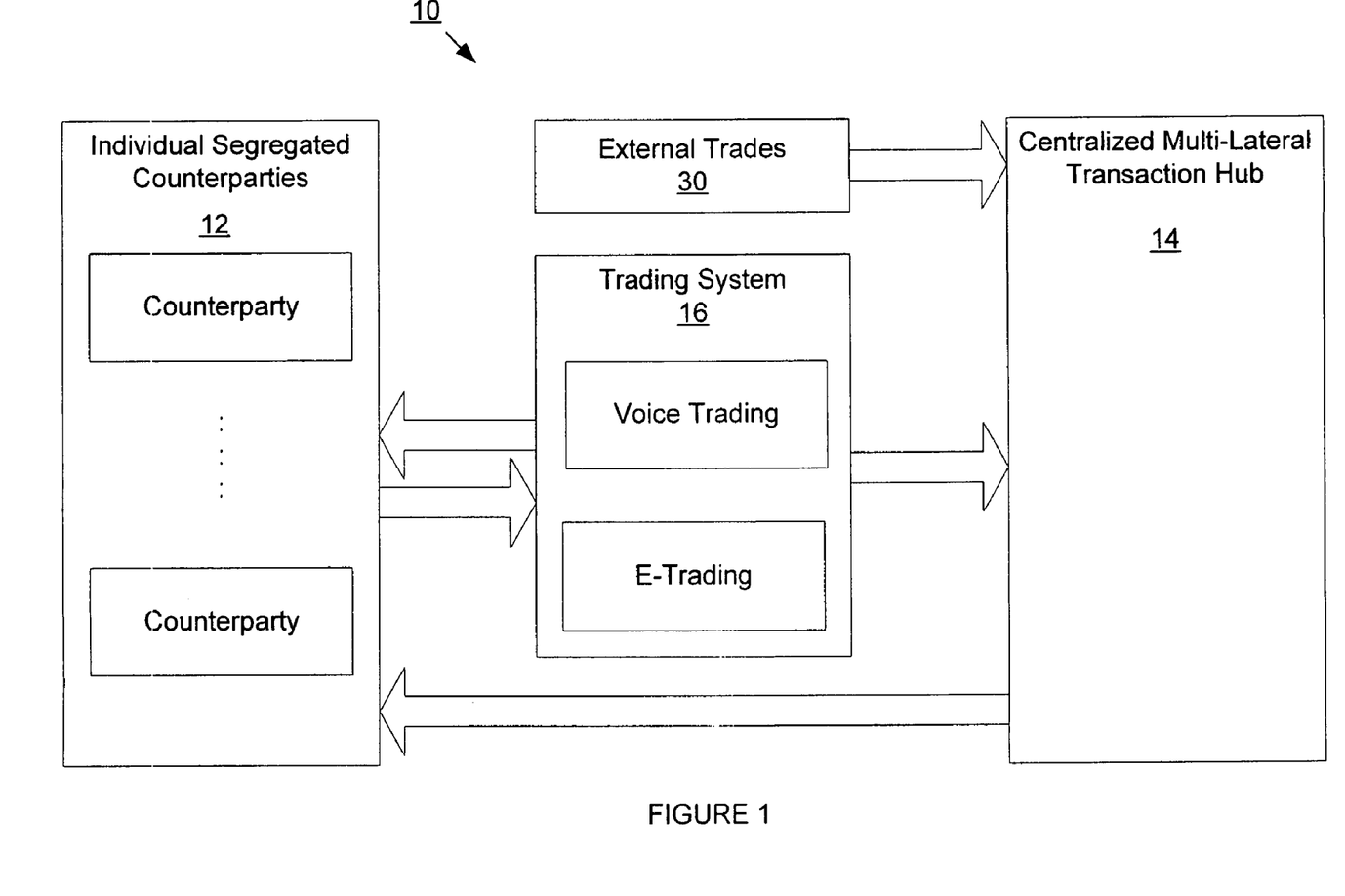
FIG. 1 is an overall block diagram of an electronic netting system constructed according to the present invention.

Referring now to the drawings in general and FIG. 1 in particular, it will be understood that the illustrations are for the purpose of describing a preferred embodiment of the invention and are not intended to limit the invention thereto. As best seen in FIG. 1, an electronic netting system, generally designated 10, is shown constructed according to the present invention. The electronic netting system 10 includes three components: a plurality of individual, segregated counterparties for providing bilateral trades 12; a multi-lateral transaction hub 14 for providing an aggregation of trades between the counterparties and providing for multi-lateral netting of selected and authorized bilateral trades; and a trading system 16 in communication with the transaction hub.

Preferably, the individual, segregated counterparties are financial institutions, such as banks or investment banks. Also, in the preferred embodiment the bilateral trades for OTC derivatives such as credit derivatives and most preferably credit derivatives, which are credit indices. However, other OTC derivatives assets could also be traded and netted by the present invention.

The electronic netting system 10 also includes a centralized, multi-lateral transaction hub 14 for providing an aggregation of trades between the counterparties, for providing for multi-lateral netting of selected and authorized bilateral trades, and for achieving desired counterparty credit risk profiles for each party. The arrangement in operation of the multi-lateral transaction hub will be discussed in more detail subsequently.

The present invention may further include a trading system 16 in communication with the transaction hub 14. In a preferred embodiment, the trading system is an intermediary party. The intermediary party may include at least one broker or an E-trading system or may include a combination of voice brokers and an E-trading system. In addition, external trades 30 may also be in communication with the multi-lateral transaction hub 14.

Figure 2:
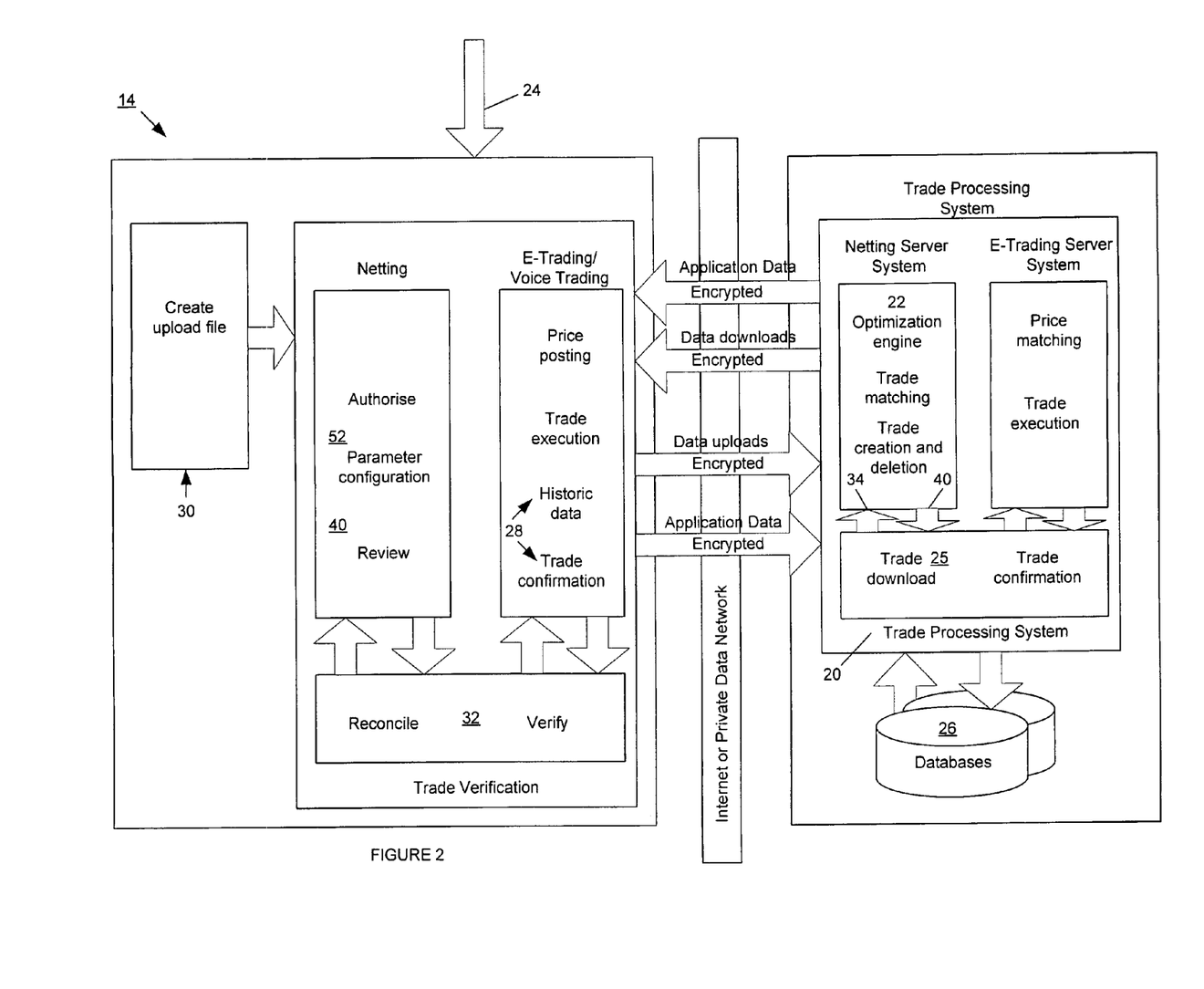
FIG. 2 is a schematic representation of the transaction hub shown in FIG. 1.

Turning now to FIG. 2, there is shown a schematic representation of the transaction hub 14 shown in FIG. 1. In the preferred embodiment, the multi-lateral transaction hub 14 includes a trade processing system 20 and a netting system 22 in communication with the trade processing system 20 for providing for the optimized, multi-lateral netting of selected and authorized bilateral trades. The trade processing system 20 includes an input 24 of the bilateral trades, a database 26 for storing the input 24, and an output 25 of the completed trades. In the preferred embodiment, the input 24 includes identification of the parties, the instrument, the price, the size, and the fee. The input 24 may further include additional trade details such as trade date, effective date, asset rank, documentation, maturity date, currency, reference obligation, day count method, date convention, payment period, and calendar region. The input 24 may also include data from E-trading or may further include external trade input. The output 25 of the trade processing system 20 may also include trade confirmations.

In the preferred embodiment, the transaction hub 14 further includes a trade verification module 32, which preferably provides for bilateral verification of the trade by both parties.

Figure 3:
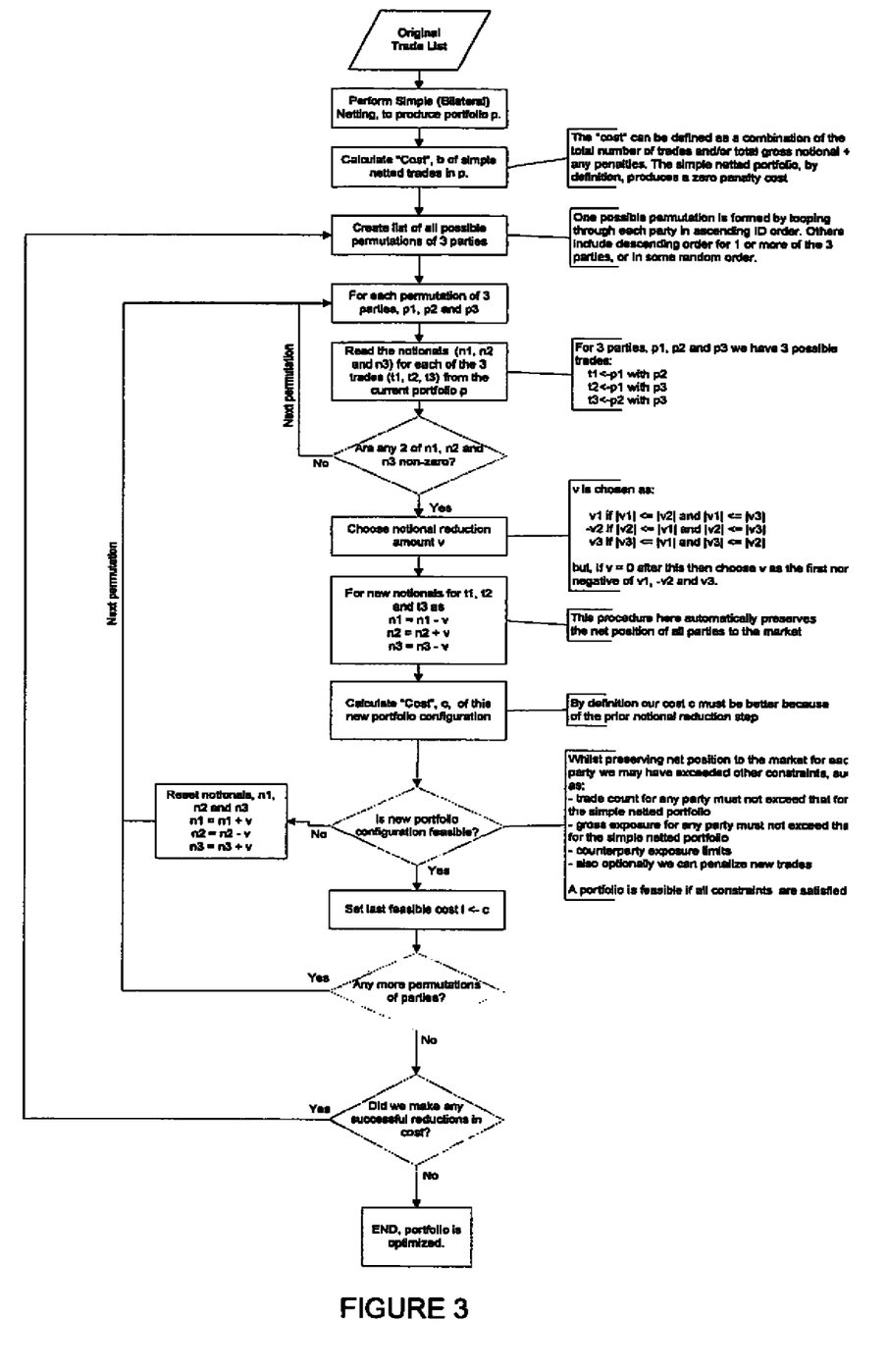
FIG. 3 is a flow chart of the main algorithm loop of the optimization engine shown in FIG. 2.
Figure 4:
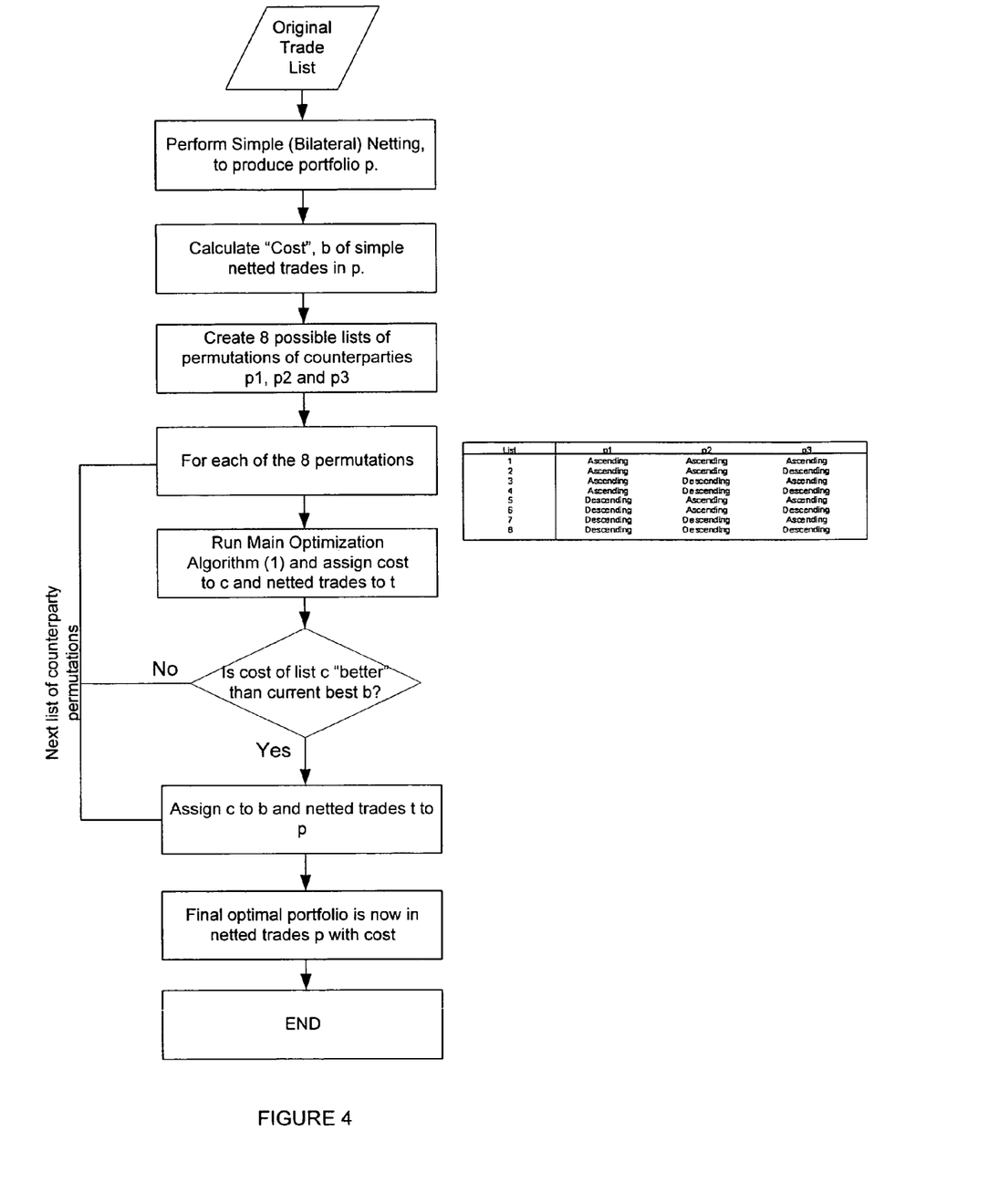
FIG. 4 is a flow chart of the optimization engine shown in FIG. 2 in recursive mode.

Turning to FIG. 3, there is shown a flow chart of the main algorithm loop of the optimization engine of the transaction hub shown in FIG. 2. In the preferred embodiment, the optimization engine receives a plurality of inputs of trades and provides an output netted trades after optimization. A flow chart of the optimization shown in FIG. 2 is best seen in FIG. 4. The application of the algorithm is recursive.

Figure 5:
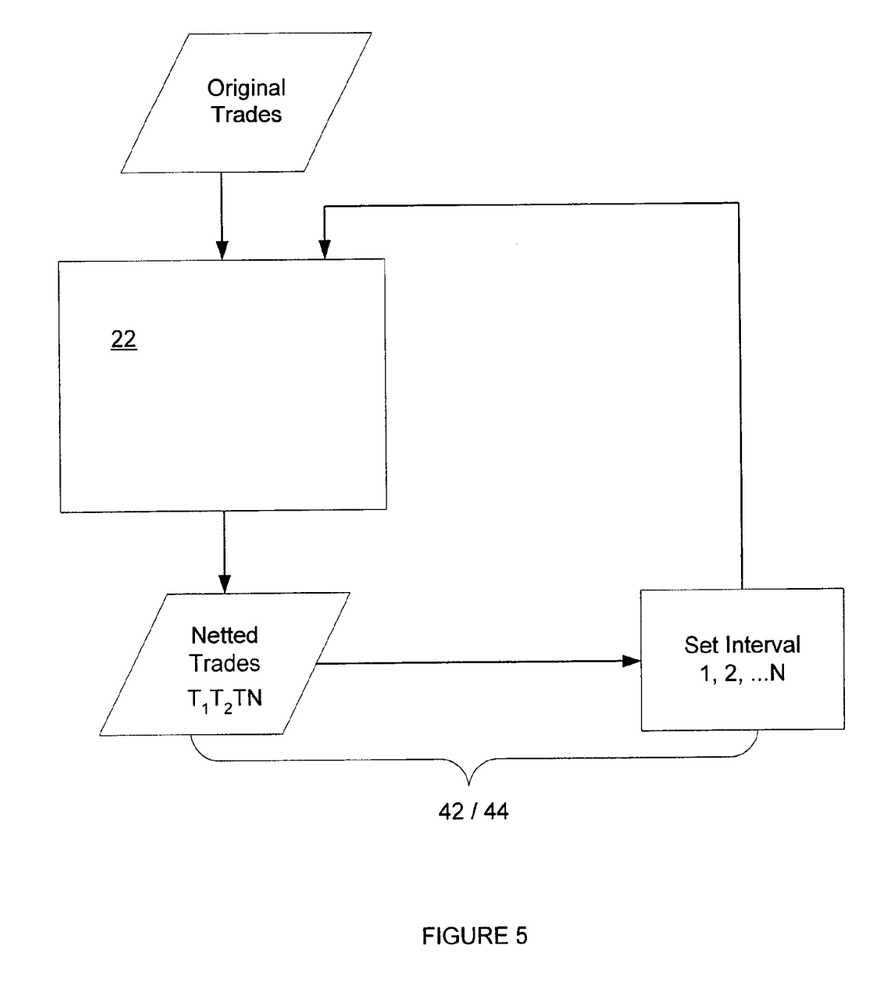
FIG. 5 is a flow chart of the optimization engine shown in FIG. 2 with intervals and/or remainder netting.

As seen in FIG. 5, the recursive optimization engine is typically run using a first netting interval, such as the end of the day. However, in the most preferred embodiment, the recursive optimization engine may further include at least one subsequent netting interval for netting the remainder of unnetted trades from the preceding netting interval. As can be appreciated, these netting intervals may be weekly or monthly, depending on the assets being traded.

The netting system 22 may further include an input of additional netting parameters 52, such as having at least one counterparty trading limit. In addition, the output of netted trades 40 may further include a payment output 46. The payment output 46 may be netted or they may be collected by a central party. Finally, the netting system 22 may also further include a reconciliation output 50 of the output of netted trades 40.

Figure 6:
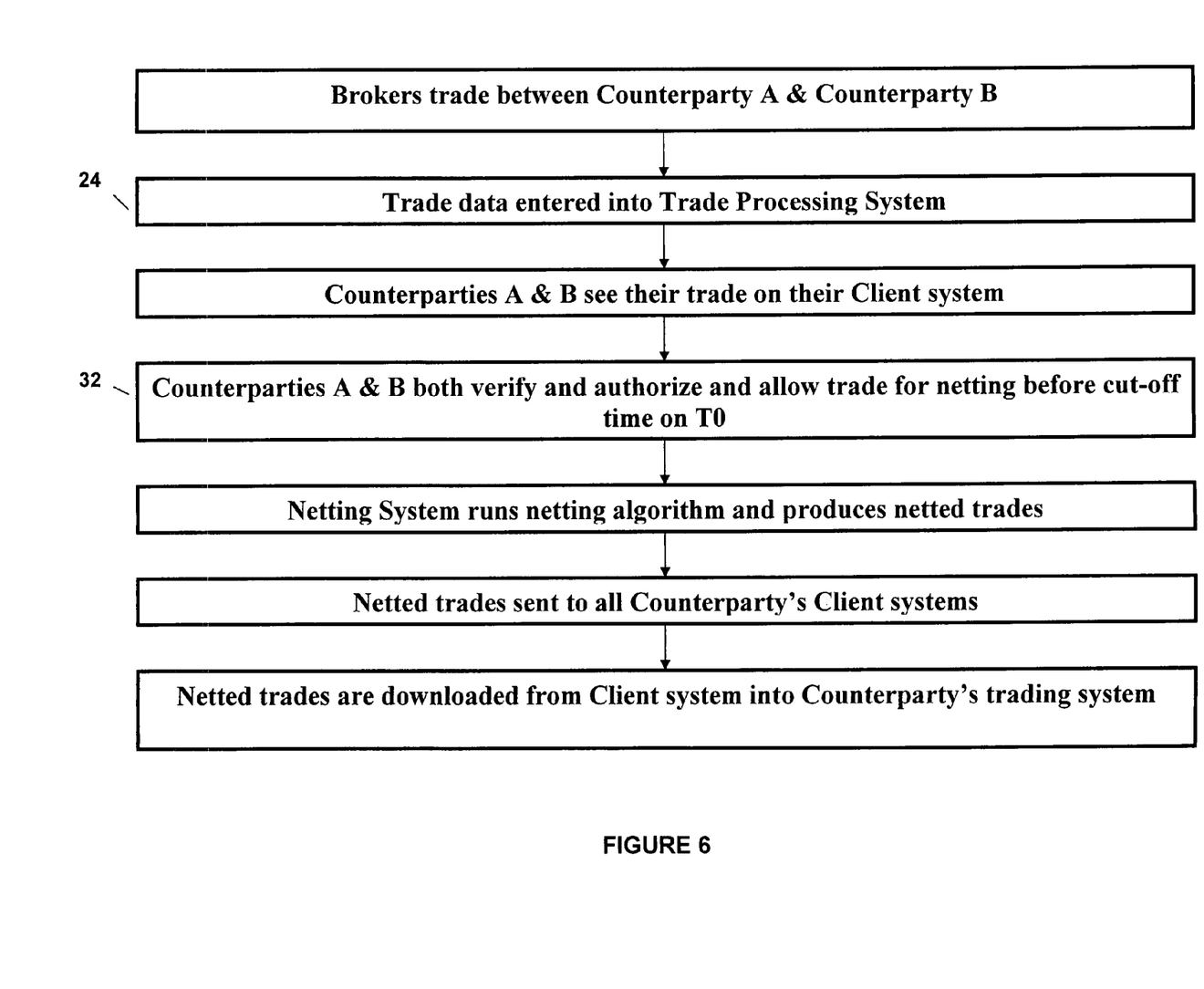
FIG. 6 is a flow chart of the operation of the electronic netting system shown in FIG. 1.

Turning to FIG. 6, there is shown a flow chart of the operation of the electronic netting system 10 shown in FIG. 1. In operation, the brokers first trade between counterparties, such as counterparty A and counterparty B, by voice trading or by E-trading or a trade is imported from an external system. Trade data is then entered into the centralized multi-lateral hub 14. The counterparties may view their trade and both counterparties may verify 32 and allow the trade for netting before the end of the pre-selected trading interval. The netting system 22 runs the recursive optimization engine and provides the optimized multi-lateral netting of the selected and authorized bilateral trades and outputs these trades 40. The output netted trades 40 are sent to each of the counterparties are then downloaded from the electronic netting system 22 into each counterparty's trading system.

Figure 7:
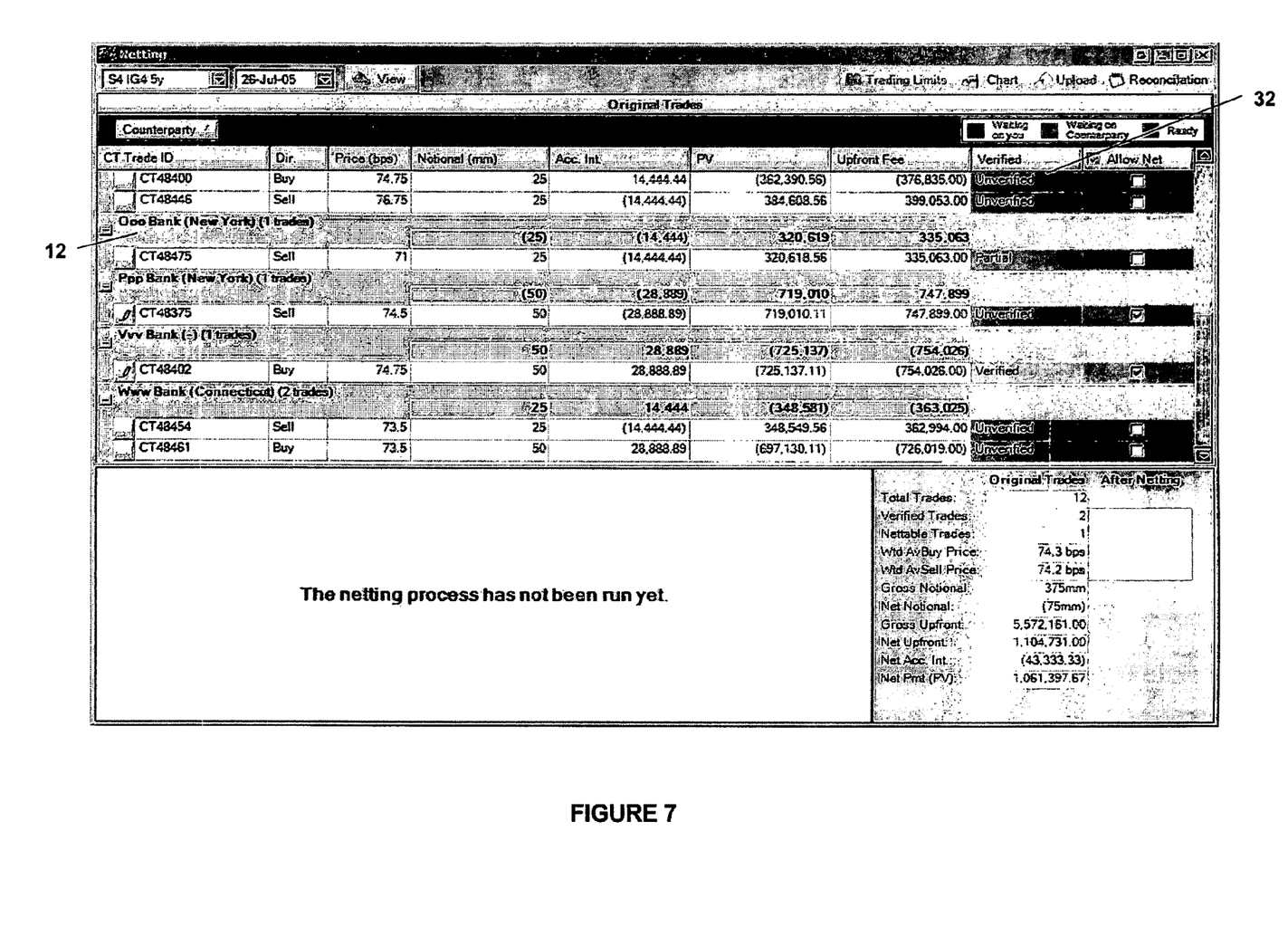
FIG. 7 is a screen shot of the raw data of original trades prior to multi-lateral netting of the selected and authorized bilateral trades.

A screen shot of the raw data of the original trades prior to multi-lateral netting of the selected and authorized bilateral trades is shown in FIG. 7. Counterparties may verify 32 and authorize trades for netting. A screen shot of the output from the transaction hub 14 following aggregation and multi-lateral netting of the selected and authorized bilateral trades is shown in FIG. 8. Counterparties may view the output of netted trades 40, payments 46, and view a reconciliation 50.

Figure 9:
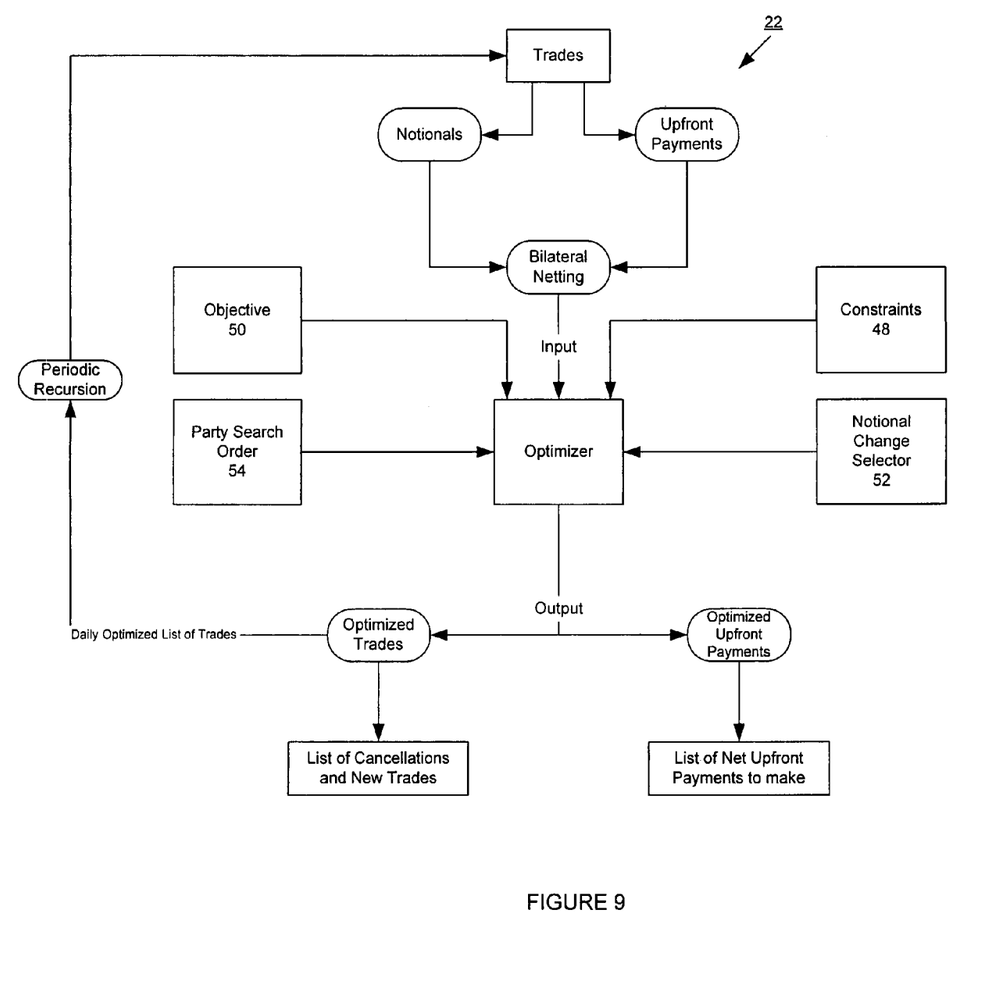
FIG. 9 is a flow chart of the operation of the electronic netting system.

FIG. 9 shows both the daily and recursive application of the optimization algorithm. The netting system 22 of the present invention which can be used for apportioning the accumulated trade values among the counterparties according to pre-determined netting parameters including a weighted distribution. The netting system 22 also allows for the generation of a diversified portfolio of counterparty credit risk. The netting system may include an input of trades, a recursive optimization engine, and an output of netted trades. The netting system may also include an input of additional netting parameters such as at least one counterparty trading limit. The additional netting parameters may include netting constraints. Multiple netting constraints 48 are allowed. Possible netting constraints include: limiting the total gross notional of each party, limiting the number of trades for each party, limiting the size of any one notional, and combinations thereof. The additional netting parameters may also include netting objectives. Possible netting objectives 50 include: total gross notionals, number of trades, variance of the notionals, counterparty credit risk profiles, and combinations thereof. The netting system may include an input of additional algorithm parameters. The algorithm parameters may include a notional change selector 52 or a party search order 54.

In one embodiment, the new process is performed as follows: the optimization process is run as described above, and then at the end of some period of time, such as one week, the system takes the last 7 days worth of optimized trades and combines the trades using bilateral netting. Next, the system runs the optimization algorithm using multi-direction search as described above and best seen in FIG. 3, with the following changes: the choice of value to change the notionals of the 3 trades at each step is now given by $d=(n1-n2+n3)/3$, where this value is rounded to the closest million. However, another value may be used. Additionally, the objective function is taken as the variance of the notionals (taking account of the direction e.g. we allow for positive and negative notionals) in the positions. At the end of the recursive optimization procedure, the resulting optimized trades replace whatever trades the bank performed with each counterparty, as is the case for the daily optimization.

This recursive process in combination with the choice of d, where $d=(n1-n2+n3)/3$ and the different objective function has the desired effect of minimizing the variance of each party's optimized position with each counterparty. For example, this process allows for the avoidance of undesirable concentrations of exposure to a particular counterparty. This technique results in few trades (one per distinct set of counterparties with large notionals).

Certain modifications and improvements will occur to those skilled in the art upon a reading of the foregoing description. By way of example, while a recursive algorithm is a preferred embodiment of the present invention, different algorithms may be used to provide for optimization. For example, a "differential evolution" algorithm or a "simulated annealing" algorithm. Also, the steps of trade verification and explicitly allowing trades for netting could potentially be omitted for some applications. Furthermore, while the transaction is centralized in a preferred embodiment of the invention, it may be decentralized. Also, while netting is preferably performed on identical instruments, netting could also be performed on similar but not identical instruments. Finally, additional netting parameters may include an indication of a counterparty's preference for reduction in number of trades versus a reduction in gross notional. It should be understood that all such modifications and improvements have been deleted herein for the sake of conciseness and readability but are properly within the scope of the following claims.

We claim:

1. An electronic netting system, the system comprising:
(a) a plurality of individual, segregated counterparty systems providing bilateral trades;
(b) a multi-lateral transaction hub: (i) providing an aggregation of trades between counterparties; (ii) providing multi-lateral netting of selected and authorized bilateral trades; and (iii) apportioning the accumulated trade values among the counterparties according to pre-determined netting parameters including a weighted distribution selectable by at least one of the counterparties, the transaction hub including: (i) a trade processing system; and (ii) a netting system in communication with the trade processing system providing optimized, multi-lateral netting of selected and authorized bilateral trades and apportioning the accumulated trade values among the counterparties; and
(c) a trading system in communication with the transaction hub, wherein the multi-lateral netting operation comprises offsetting the value of obligations resulting from bilateral trades amongst three or more counterparties without terminating any of said trades.

2. The electronic netting system according to claim 1, wherein the trading system is an intermediary party system.

3. The electronic netting system according to claim 2, wherein the intermediary party system processes trade data from at least one voice broker.

4. The electronic netting system according to claim 2, wherein the intermediary party system is an E-trading system.

5. The electronic netting system according to claim 2, wherein the intermediary party system includes at least one voice broker and an E-trading system.

6. The electronic netting system according to claim 1, wherein the individual, segregated counterparty systems are associated with financial institutions.

7. The electronic netting system according to claim 6, wherein the financial institutions are banks.

8. The electronic netting system according to claim 7, wherein the banks include investment banks.

9. The electronic netting system according to claim 1, wherein the bilateral trades are OTC derivatives.

10. The electronic netting system according to claim 9, wherein the OTC derivatives are credit derivatives.

11. The electronic netting system according to claim 10, wherein the credit derivatives are credit indices.

12. The transaction hub according to claim 1, wherein the trade processing system includes an input of the bilateral trades, a database for storing the input and an output of the completed trades.

13. The transaction hub according to claim 12, wherein the input includes the parties, the instrument, the price, the size, and the upfront fee.

14. The transaction hub according to claim 13, wherein the input further includes additional trade details.

15. The transaction hub according to claim 12, wherein the input includes data from E-trading.

16. The transaction hub according to claim 12, further including external trade input.

17. The transaction hub according to claim 12, wherein the output includes trade confirmations.

18. The transaction hub according to claim 12, further including a trade verification module.

19. The transaction hub according to claim 18, wherein the trade verification module is bilaterally verified.

20. The transaction hub according to claim 1, wherein the netting system includes an input of trades ($T_1, T_2, \ldots T_N$), a recursive optimization engine, and an output of netted trades.

21. The transaction hub according to claim 20, wherein the recursive optimization engine further includes a first netting interval.

22. The transaction hub according to claim 21, wherein the recursive optimization engine further includes at least one subsequent netting interval for netting the remainder of unnetted trades from the preceding netting interval.

23. The transaction hub according to claim 20, further including an input of additional netting parameters.

24. The transaction hub according to claim 23, wherein the additional netting parameters include at least one counterparty trading limit.

25. The transaction hub according to claim 20, wherein the output of netted trades further includes a payment output.

26. The transaction hub according to claim 25, wherein the payments are netted.

27. The transaction hub according to claim 25, wherein the payments are collected by a central party.

28. The transaction hub according to claim 20, wherein the output of netted trades further includes a reconciliation output.

29. The transaction hub according to claim 23, wherein the additional netting parameters include netting constraints.

30. The transaction hub according to claim 29, wherein the netting constraints are selected from the group consisting of limits of trades; limits of notionals and combinations thereof.

31. The transaction hub according to claim 23, wherein the additional netting parameters include netting objectives.

32. The transaction hub according to claim 31, wherein the netting objectives are selected from the group consisting of total gross notionals; number of trades; variance of the notional and combinations thereof.

33. The transaction hub according to claim 20, further including an input of additional algorithm parameters.

34. The transaction hub according to claim 33, wherein the additional algorithm parameters include a notional change selector.

35. The transaction hub according to claim 33, wherein the additional algorithm parameters include a party search order.

* * * * *